July 23, 1968   W. I. JONES ET AL   3,393,432
FASTENING DEVICES
Filed Nov. 12, 1965

Inventors:
Walter I. Jones &
Julius B. Wilhelmi,
by Gordon Needleman
Atty.

3,393,432
FASTENING DEVICES
Walter I. Jones, Littleton Common, and Julius B. Wilhelmi, Nantasket, Mass., assignors to United-Carr Incorporated, Boston, Mass., a corporation of Delaware
Filed Nov. 12, 1965, Ser. No. 507,473
1 Claim. (Cl. 24—224)

ABSTRACT OF THE DISCLOSURE

This invention is directed at a combination of a fastening device, a support, and an article to be held, the fastening device having a slot means for engaging a stud which extends from the support and the fastening device having a series of prongs for preventing movement in a predetermined direction when the article to be held is engaged to the fastening device.

---

This invention relates generally to fastening devices and more specifically to a fastening device utilizing a stud and a slidably engageable adapter element.

An object of the present invention is to provide a fastening device for holding an article to a support without the necessity of forming an aperture in the support.

Another object of the invention is to provide a stud engaged to a support and an adapter element including a keyhole slot formed therethrough.

A still further object of the present invention is to provide an escutcheon and the like having an adapter element engaged thereto and the adapter element having means of engaging a stud attached to a support.

Figure 1:
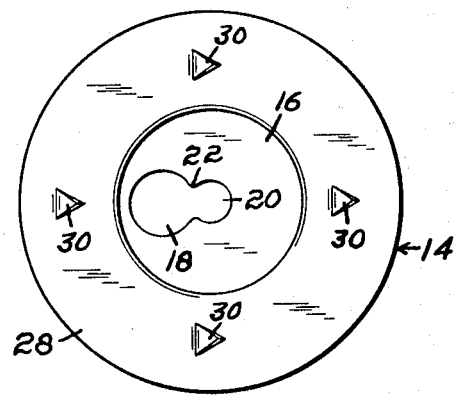
FIG. 1 is a bottom plan view of the adapter.
Figure 2:
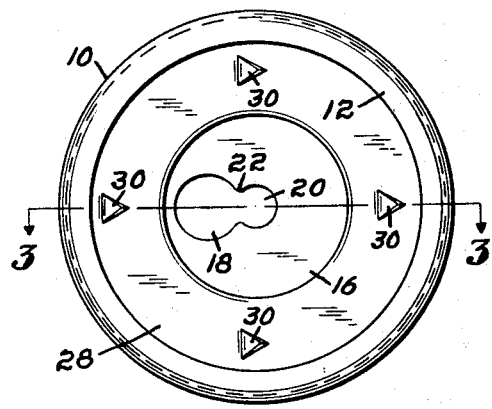
FIG. 2 is a bottom plan view of the adapter with cap.

There is shown in the drawings an escutcheon cap 10 in the form of a shallow truncated cone having a peripheral, terminal edge 12.

The adapter 14 comprises a circular base portion 16, having a first aperture 18 formed therethrough and having a second aperture 20 formed through said base portion 16 opening into said first aperture 18 through a constricted channel 22. The first aperture 18 has a greater diameter than the second aperture 20. The base portion 16 has extending from its periphery a wall 26, in integral right angle relation therewith and providing a shallow cup-like configuration therewith.

Figure 3:
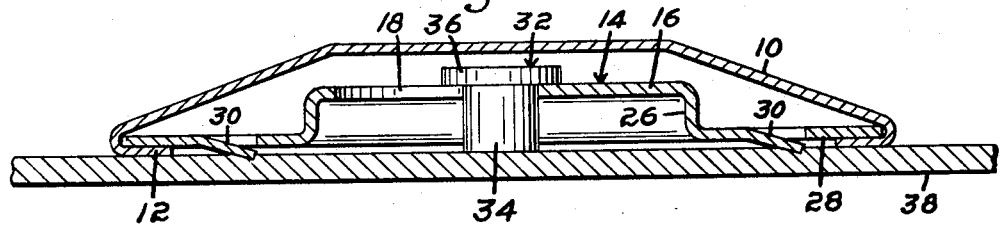
FIG. 3 is a section taken on line 3—3 of FIG. 2, with the stud and support added.

The escutcheon cap 10 is engaged with the adapter 14 by inserting the adapter 14, with its circular base portion 16 first, within the area defined by the cap 10 and then curling the terminal edge 12 underneath the engagement portion 28 as shown in FIGURE 3. The wall 26 has an engagement portion 28 extending from its terminal edge in right angle relation to the wall 26 and in spaced parallel relationship with the plane of the base portion 16. The engagement portion 28 is also circular in configuration and includes a series of teeth 30 formed from the material thereof spaced 90° from their respective adjacent teeth in a circular pattern. The apexes of all of the teeth 30 are directed toward the same plane and away from the plane of the base portion 16.

The stud 32 comprises a cylindrical shank 34 extending from an enlarged head portion 36 of larger diameter than the shank 34 and integral with one end thereof.

The stud 32 is soldered, adhered or otherwise attached to the upper face of a support 38 without forming an aperture through the upper face.

To attach the assembly of the escutcheon cap 10 and the adapter 14 with the assembly of the stud 32 and the support 38, the head portion 36 is passed through the larger first aperture 18 and then the assembly of the cap 10 and the adapter 14 is pushed, to pass the cylindrical shank 34 through the constricted channel 22, placing the vertical shank 34 within the second aperture 20 with the head portion 36 of the stud 32 in superimposed abutting relationship with the base portion 16 adjacent the second aperture 20. This force is applied in the direction opposite to that toward which the teeth 30 are directed. The teeth 30 therefore flex toward the base portion 16 during the engagement. However, any effort to withdraw the adapter from its engagement with the stud 32 will be resisted by the teeth 30, since it will apply a force against the apexes of the teeth 30 as shown in FIG. 3. The teeth 30 abut the upper surface of the support 38 or may slightly penetrate it.

With reference to the foregoing description it is to be understood that what has been disclosed therein represents only a single embodiment of the invention and is to be construed as illustrative rather than restrictive in nature and that the invention is best described by the following claim.

What is claimed:

1. The combination of a fastening device, a support and an escutcheon cap, said fastening device comprising a base portion having a terminal edge, a wall extending from said edge and an engagement portion extending from a terminal edge of said wall, said engagement portion having a series of teeth extending therefrom and having their apexes directed towards the same plane and in the same general direction relative to each other, a first aperture and a second aperture connected by a constricted channel, said first aperture having a greater diameter than said second aperture, and a stud comprising a shank portion, said shank portion having an inner end, said stud being secured at the inner end of said shank portion to said support without perforation of said support, and a head portion attached to the other end of said shank portion, said head portion overlying a portion of said base portion adjacent said second aperture and the apexes only of said teeth engaging said support at a surface thereof to resist movement of the fastener relative to the stud in a direction in which the apexes of the teeth are pointed, said escutcheon cap being engaged with said adapter and a portion of said escutcheon cap being in space superposed relation to said fastening device.

References Cited

UNITED STATES PATENTS

| | | | |
|---|---|---|---|
| 835,068 | 11/1906 | Johnston | 24—222 X |
| 883,771 | 4/1908 | Alden et al. | 24—222 |
| 988,558 | 4/1911 | England | 24—224 |

FOREIGN PATENTS

| | | |
|---|---|---|
| 843,774 | 7/1952 | Germany. |

BOBBY R. GAY, *Primary Examiner.*

E. SIMONSEN, *Assistant Examiner.*